Figure 1:
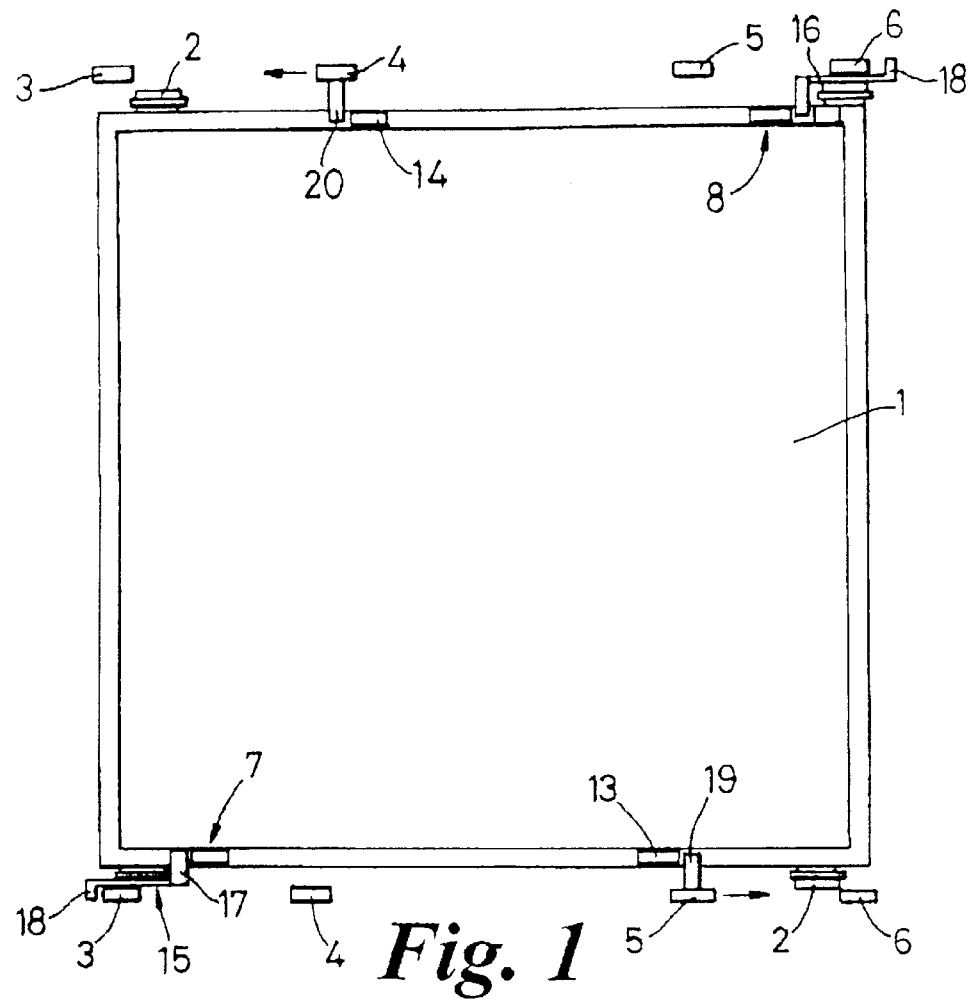

United States Patent [19]
Grainger

[11] Patent Number: 6,059,130
[45] Date of Patent: May 9, 2000

[54] RACK STORAGE SYSTEMS

[76] Inventor: Allan Grainger, 8, Pen-y-Fro, Cwmdare, Aberdare, Mid-Glamorgan, CF44 8Pt., United Kingdom

[21] Appl. No.: 09/341,466
[22] PCT Filed: Jan. 12, 1998
[86] PCT No.: PCT/GB98/00088
 § 371 Date: Aug. 11, 1999
 § 102(e) Date: Aug. 11, 1999
[87] PCT Pub. No.: WO98/30135
 PCT Pub. Date: Jul. 16, 1998

[30] Foreign Application Priority Data

Jan. 11, 1997 [GB] United Kingdom .................. 9700492

[51] Int. Cl.$^7$ ...................................................... A47F 5/00
[52] U.S. Cl. ......................... 211/183; 211/151; 211/175; 312/334.44
[58] Field of Search ...................... 211/151, 175, 211/183; 312/334.1, 334.44, 334.47

[56] References Cited

U.S. PATENT DOCUMENTS

| | | | |
|---|---|---|---|
| 3,465,897 | 9/1969 | Schumann | ............................... 211/151 |
| 5,513,941 | 5/1996 | Kulas et al. | ......................... 211/151 X |
| 5,598,934 | 2/1997 | Krummell et al. | ...................... 211/151 |
| 5,641,082 | 6/1997 | Grainger . | |
| 5,848,731 | 12/1998 | Allen | ...................................... 211/151 |
| 5,873,473 | 2/1999 | Pater | .................................. 211/151 X |

FOREIGN PATENT DOCUMENTS 0 293 894  12/1988  European Pat. Off. .

*Primary Examiner*—Robert W. Gibson, Jr.
*Attorney, Agent, or Firm*—Young & Thompson

[57] ABSTRACT

A stop system for a platform (1) which is movable horizontally from a central position within a supporting frame (3, 4, 5, 6) to project to one side or the other of the frame has manually releasable latches (14, 15). These co-operate with stops (7, 8) near diagonally opposite corners of the platform, normally to hold the platform centered. Each latch can be disengaged from its stop to allow the platform to move out from the associated side of the frame, and then released to co-operate with another stop (13, 14) on the platform when that reaches its outward limit. A further stop (19, 20) can simultaneously engage one of the first stops (7, 8) to guard against skewing. On returning the platform (1) to the centered position, the latches (14, 15) automatically re-engage.

8 Claims, 3 Drawing Sheets

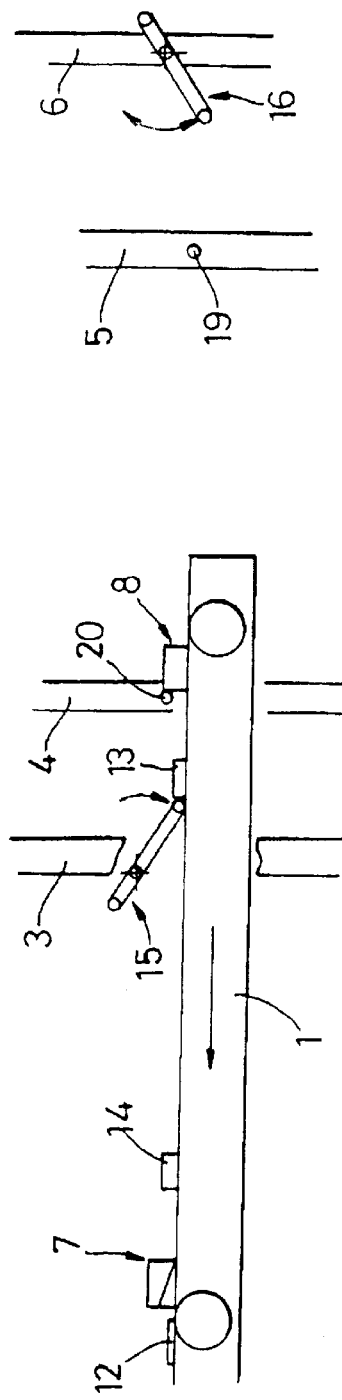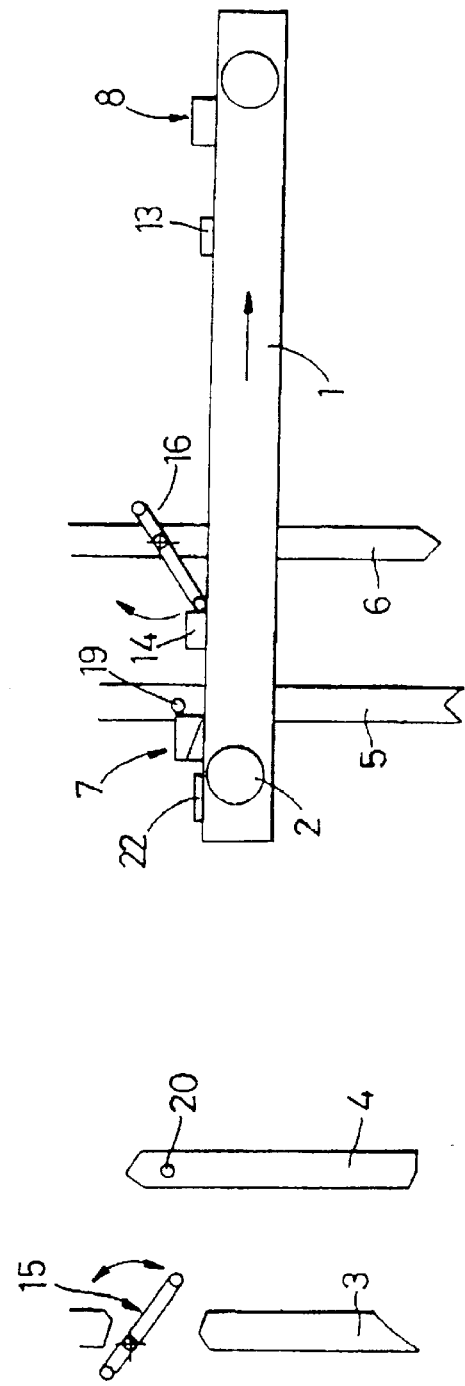

RACK STORAGE SYSTEMS

This invention relates to rack storage systems. It is concerned with racks having platforms or shelves which can be slid or rolled out from storage to access positions, these access positions being on opposite sides of a frame which supports the platform. A common arrangement is to have racks in parallel, forming aisles between them, and the platforms can be moved out into either aisle on opposite sides of its supporting frame.

It is important that when the platform is centred within the frame that it should be held immobile. It is also necessary that it should be releasable from either side so that it can be pulled out into the appropriate aisle. Thirdly, there should be means limiting the outward travel of the platform, and fourthly, when it is pushed back in again, the platform should be automatically arrested at the central, storage position.

It is the aim of this invention to provide a stop system that will meet these requirements.

According to the present invention there is provided a stop system for a platform which is movable horizontally from a centred position within a supporting frame to project to one side or the other of the frame, the frame carrying latches which co-operate with first and second pairs of stops on the sides of the platform, the first pair providing abutments adjacent opposite ends of the platform facing outwardly of the frame against which the respective latches engage when the platform is centred and having ramps facing inwardly of the frame to engage and temporarily lift the latches on return of the platform to the centred position, and the second pair being disposed to engage the respective latches when the platform is moved outwardly of the frame and thereby limit the outward travel of the platform.

Preferably, the latches are at diagonally opposed positions with respect to the centred platform. This means that one stop from each pair is on one side of the platform, and the other stop from each pair is on the other side.

Preferably, the frame carries a third pair of stops positioned at opposite sides of the platform so that, when the platform is arrested in either moved out position by a latch on one side engaging one of the second pair of stops, the stop of the third pair on the opposite side engages a further abutment provided by a stop of the first pair.

As will be more apparent later, this guards against any tendency of the platform to skew when arrested by a stop at one side only.

Conveniently, each latch includes a bar pivoted off centre about a horizontal axis transverse to the direction of movement of the platform, so that the inner end of the bar falls to bear on the adjacent side of the platform. In practice, this inner end may have a projection parallel to the pivot axis, this projection being the part which actually engages the platform and the stops. Each projection may be equipped with a roller to run over the platform and ramp.

The outer end of each latch bar may be provided with a handle which is pulled down to release the platform. It can and indeed should be released when the platform has moved out a bit.

Preferably, a shallow detent is provided positively to locate each latch at the base of the associated abutment on the first pair of stops. This will help to eliminate any rattle.

Figure 2:
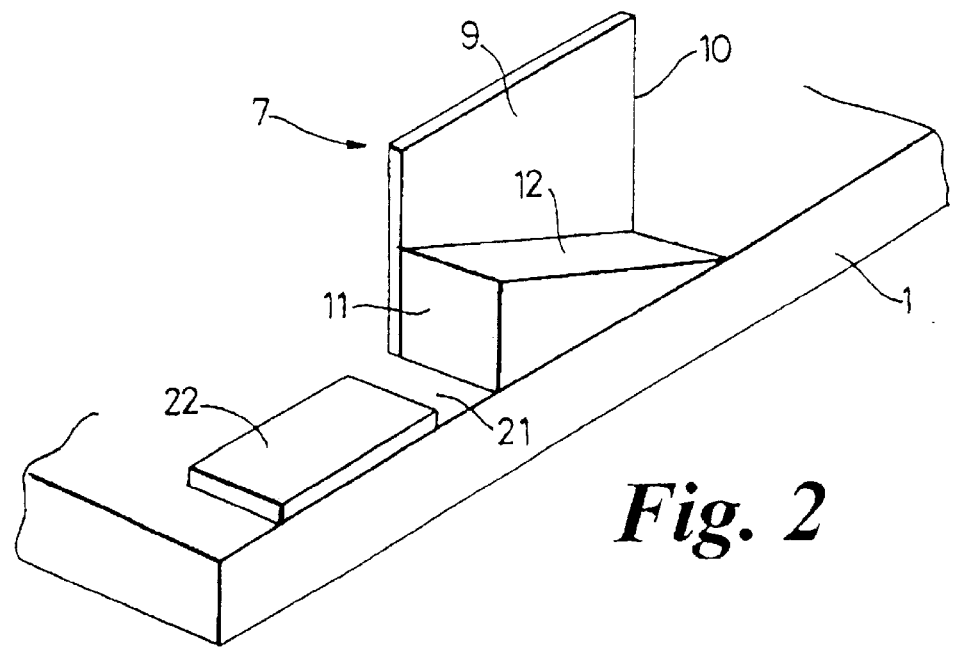
Figure 3:
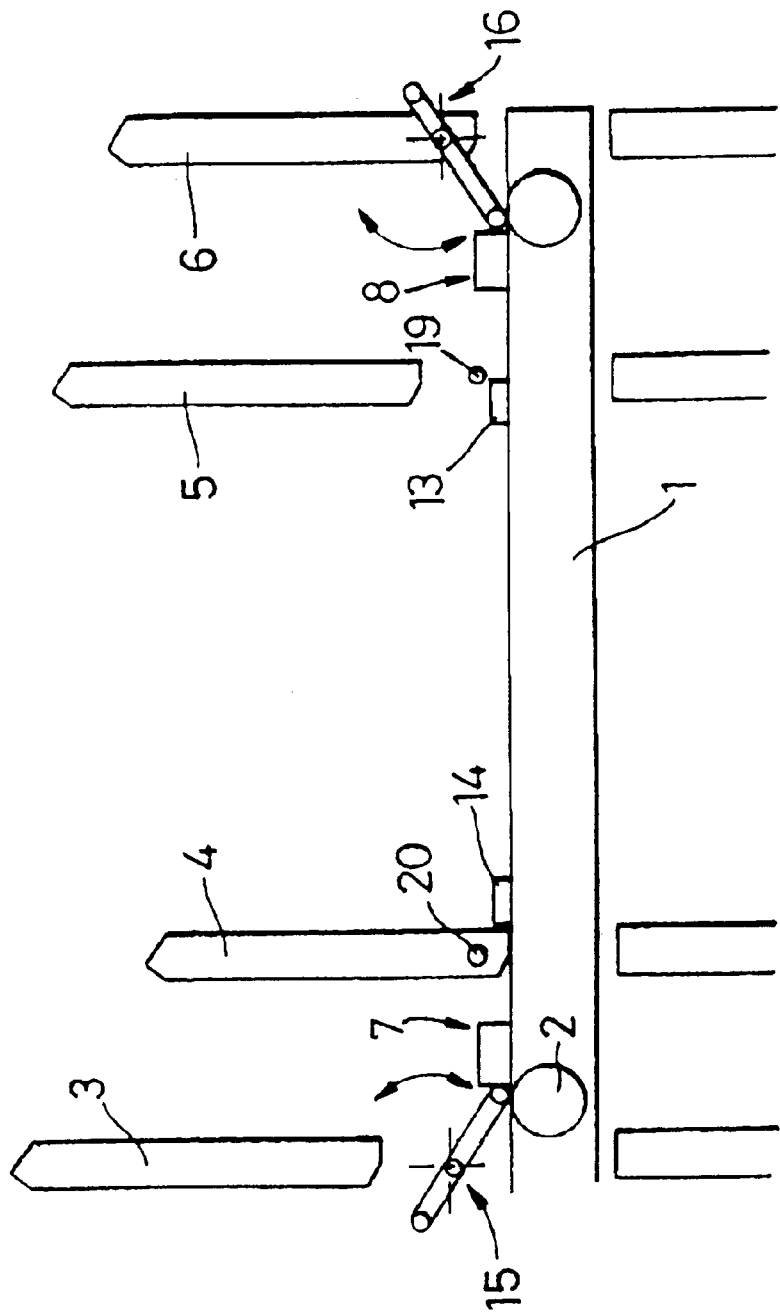

For a better understanding of the invention, one embodiment will now be described, by way of example, with reference to the accompanying drawings, in which:

FIG. 1 is a plan view of a movable platform forming part of a rack storage system, FIG. 2 is a perspective view showing a detail of a corner of the platform, FIG. 3 is a side elevation of a platform and part of its supporting frame with the platform centred in a storage position, FIG. 4 is a side elevation corresponding to FIG. 2 with the platform moved out into one projecting position, and FIG. 5 is a side elevation corresponding to FIG. 2 but with the rack moved out into the opposite projecting position.

A platform 1 is of square or rectangular form and is carried by rollers 2 on intermediate horizontal sliding or rolling rails (not shown) which are in turn carried by a frame some of whose uprights 3, 4, 5 and 6 are shown. The details of how the platform is mounted and rolled to project to one side or the other of the frame do not form part of the present invention and will not be described in detail.

Each side of the platform 1 has two stops of different character. The stops 7 and 8 are at diagonally opposed positions near corners of the platform 1 and each consists (as best seen in FIG. 2) of an upright rectangular plate 9 providing a vertical abutment 10 facing backwardly towards the transverse centre line of the platform and a triangular member, outboard of the plate 9, providing an abutment 11 facing outwardly, towards the adjacent transverse edge of the platform, and a ramp 12 facing backwardly and upwardly into the frame. The other stops 13 and 14 are simple blocks, lower than the plates 9. They are also diagonally symmetrical with respect to the centre of the platform, but rather further from the other corners.

Two outer vertical frame members 3 and 6 at diagonally opposed positions carry pivoted latch bars 15 and 16 respectively. They are pivoted off-centre about horizontal axes transverse to the direction of movement of the platform, so that they naturally assume an attitude where their inner ends fall down and rest by projections 17 on the edges of the platform. But if the platform was removed, they would not pivot significantly further, having means (not shown) for limiting their arc of movement. Each projection 17 is parallel to the pivot axis and extends far enough to co-operate with the associated abutment 11 but not as far as the plate 9. These projections may be equipped with rollers so that they will run easily along the associated edge and ramp 12. The outer, upper ends of the latch bars 15 have handles 18.

The inner vertical frame members 4 and 5 adjacent the members 3 and 6 not carrying the latch bars are equipped with stops 19 and 20 at a height where they will be cleared by the stops 13 and 14 but not by the plates 9 of the stops 7 and 8.

In front of each abutment 11 there is a depression 21 formed by a small plate 22 welded on to the platform at the adjacent corner, and these locate the projections 17 and reduce any tendency of the platform, when centred, to rattle.

When the platform 1 is centred in the storage position, as seen in FIGS. 1 and 3, both latch bars 15 and 16 are engaged by their projections 17 with the abutments 11 of the stops 7 and 8. The platform cannot therefore move in either direction.

If the platform is to be moved out to the left as seen in the Figures, the latch bar 15 is pivoted by a downward pull on its handle 18, so that its projection 17 clears the abutment 11. The platform is then free to move out to the left, there being no significant restraint from the other latch bar 16: the depression 21 on that side does not trap its projection 17. There is no mutual interference of the stops 14 and 19, since they are at different heights and clear each other.

Once the platform is moving, the latch bar 15 can be released and it falls back to allow its projection 17 to run on the edge of the platform 1. Eventually, this projection ends up against the stop 13, as seen in FIG. 4, and the platform is arrested.

At the same time, the abutment 10 of the stop 8 comes up against the stop 20, and so the platform is arrested at both sides and there is no tendency to skew.

Once the platform 1 has been loaded or unloaded, it is simply pushed back in, and as it reaches the central position the projection 17 of the latch bar 15 rides up the ramp 12 of the stop 7 and then falls down to engage the abutment 11. At the same time, the abutment 11 of the opposite stop 8 engages the projection 17 of the latch bar 16, which has remained in the attitude shown in FIG. 4.

With the symmetrical arrangement, it will be seen that exactly the same sequence is followed when the platform is shifted out to the opposite side of the frame.

It will be appreciated from the positioning of the latches that it is practical for someone to release the platform only when standing at the side from which it is to project. There is therefore very little or no danger of the platform being pushed out into an aisle not visible to the operative.

I claim:

1. A stop system for a platform (1) which is movable horizontally from a centred position within a supporting frame (3, 4, 5, 6) to project to one side or the other of the frame, the frame carrying latches (14, 15) which co-operate with first and second pairs of stops on the sides of the platform, the first pair (7, 8) providing abutments (11) adjacent opposite ends of the platform facing outwardly of the frame against which the respective latches engage when the platform is centred and having ramps (12) facing inwardly of the frame to engage and temporarily lift the latches on return of the platform to the centred position, and the second pair (13, 14) being disposed to engage the respective latches (15, 16) when the platform is moved outwardly of the frame and thereby limit the outward travel of the platform.

2. A stop system as claimed in claim 1, wherein the latches (15, 16) are at diagonally opposed positions with respect to the centred platform (1).

3. A stop system as claimed in claim 2, wherein the frame carries a third pair of stops (19, 20) positioned at opposite sides of the platform so that, when the platform is arrested in either moved out position by a latch (15, 16) on one side engaging one of the second pair of stops (13, 14), the stop (19, 20) of the third pair on the opposite side engages a further abutment (10) provided by a stop (8, 7) of the first pair.

4. A stop system as claimed in claim 1, wherein each latch (15, 16) includes a bar pivoted off centre about a horizontal axis transverse to the direction of movement of the platform, so that the inner end of the bar falls to bear on the adjacent side of the platform.

5. A stop system as claimed in claim 4, wherein each said inner end has a projection (17) parallel to the pivot axis, this projection being the part which actually engages the platform (1) and the stops.

6. A stop system as claimed in claim 5, wherein each projection (17) is equipped with a roller to run over the platform (1) and ramp (12).

7. A stop system as claimed in claim 4, wherein the outer end of each latch bar is provided with a handle (18) which is pulled down to release the platform (1).

8. A stop system as claimed in claim 1, wherein a shallow detent (21) is provided positively to locate each latch (7, 8) at the base of the associated abutment (11) on the first pair of stops (7, 8).

\* \* \* \* \*